United States Patent
Tamura

(10) Patent No.: US 10,742,943 B2
(45) Date of Patent: Aug. 11, 2020

(54) PROJECTOR AND METHOD FOR CONTROLLING PROJECTOR

(71) Applicant: SEIKO EPSON CORPORATION, Tokyo (JP)

(72) Inventor: Akihiko Tamura, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/367,467

(22) Filed: Mar. 28, 2019

(65) Prior Publication Data

US 2019/0306478 A1    Oct. 3, 2019

(30) Foreign Application Priority Data

Mar. 29, 2018  (JP) ................. 2018-063453

(51) Int. Cl.
*H04N 9/31*    (2006.01)

(52) U.S. Cl.
CPC ......... *H04N 9/3194* (2013.01); *H04N 9/3155* (2013.01); *H04N 9/3182* (2013.01)

(58) Field of Classification Search
None
See application file for complete search history.

(56) References Cited

U.S. PATENT DOCUMENTS

2015/0208050 A1*   7/2015   Pawlak ............... H04N 9/3194
                                                              348/189

FOREIGN PATENT DOCUMENTS

JP    2015-159524 A    9/2015
JP    2015-166893 A    9/2015

* cited by examiner

*Primary Examiner* — Samira Monshi
(74) *Attorney, Agent, or Firm* — Oliff PLC

(57) ABSTRACT

A projector includes an image projection section, an imager, a calibration processor that performs calibration, an information acquirer that acquires information on the state in which the projector is installed, and an image generator that generates a calibration image corresponding to the state in which the projector is installed, and the calibration processor causes the image projection section to project the calibration image generated by the image generator to perform the calibration.

17 Claims, 12 Drawing Sheets

PROJECTOR AND METHOD FOR CONTROLLING PROJECTOR

BACKGROUND

1. Technical Field

The present invention relates to a projector and a method for controlling the projector.

2. Related Art

There has been a known projector that projects a calibration image containing a position identifying mark and performs calibration based on a captured image that is the result of image capture of the projected image (see JP-A-2015-159524 and JP-A-2015-166893, for example). In a projector of this type, the process of detecting the mark from the captured image fails in some cases due, for example, to distortion of the shape of the mark in the captured image. To avoid the problem, there has been a proposed approach of performing, when the calibration fails, the calibration again under a changed condition. For example, the projector described in JP-A-2015-166893 performs, when the detection of the mark fails, the calibration by using a calibration image of a different type.

There is, however, a need for reduction in the period required for the calibration, and it is desired to increase the efficiency of the calibration.

SUMMARY

An advantage of some aspects of the invention is to increase the success rate of calibration performed by using an image projected by a projector for an increase in the efficiency of the calibration.

An aspect of the invention is directed to a projector including a projection section that projects an image on a projection surface, an imager that captures an image of a range containing at least part of the projection surface, a calibration processor that causes the projection section to project a calibration image in which a position identifying mark is placed and detects the mark from a captured image from the imager to perform calibration, an information acquirer that acquires information on a state in which the projector is installed with respect to the projection surface, and an image generator that generates, based on the information acquired by the information acquirer, a calibration image corresponding to the state in which the projector is installed, and the calibration processor causes the projection section to project the calibration image generated by the image generator to perform the calibration.

According to the aspect of the invention, the projector, which uses the calibration image corresponding to the state in which the projector is installed, is advantageously likely to detect the mark in the calibration image when performing the calibration. The success rate of the calibration can thus be increased, whereby the calibration can be efficiently performed.

In the aspect of the invention, in the captured image that is a result of an action of capturing an image of the calibration image projected on the projection surface, the image generator may generate the calibration image in such a way that the mark has a shape having sides perpendicular to each other.

According to the configuration described above, the mark in the calibration image is likely to be detected from the captured image, whereby the success rate of the detection of the mark can be further improved.

In the aspect of the invention, the image generator may generate the calibration image in such a way that the mark located in a corner portion of the projection image projected by the projection section has a shape having side perpendicular to each other.

According to the configuration described above, the mark located in the corner portion of the projection image can be readily detected from the captured image, whereby it can be expected that the accuracy of the calibration is improved.

In the aspect of the invention, the image generator may generate the calibration image containing the mark formed of a set number, and in a case where an interval between the plurality of marks placed in the calibration image is smaller than or equal to a reference value, the image generator may generate the calibration image containing the marks the number of which is smaller than the set value.

According to the configuration described above, a satisfactory interval between the marks placed in the calibration image can be provided, whereby the success rate of the calibration can be further increased.

In the aspect of the invention, the information acquired by the information acquirer may contain information on relative positions of the projection surface and the imager.

According to the configuration described above, the calibration image can be generated in correspondence with the relative positions of the projection surface and the imager, which greatly affect the position and shape of the mark in the captured image. A calibration image that precisely reflects the position and shape of the mark in the captured image can thus be generated, whereby the success rate of the detection of the mark from the captured image can be further increased.

In the aspect of the invention, the imager may include an imaging system including a lens, and an imaging device, and the information acquired by the information acquirer may contain information on relative positions of the projection surface and an optical axis of the imaging system.

According to the configuration described above, the calibration image can be generated in correspondence with the relative positions of the projection surface and the optical axis of the imaging system. A calibration image that precisely reflects the position and shape of the mark in the captured image can thus be generated, whereby the success rate of the detection of the mark from the captured image can be further increased.

In the aspect of the invention, the information acquired by the information acquirer may contain information on relative positions of the optical axis of the imaging system and the imaging device.

According to the configuration described above, the calibration image can be generated in correspondence with the relative positions of the optical axis of the imaging system and the imaging device. A calibration image that precisely reflects the position and shape of the mark in the captured image can thus be generated, whereby the success rate of the detection of the mark from the captured image can be further increased.

In the aspect of the invention, the information acquired by the information acquirer may contain information on relative positions of the projection surface, the projection section, and the imager.

According to the configuration described above, the calibration image can be generated in correspondence with the relative positions of the projection surface, the projection section, and the imager. A calibration image that precisely reflects the position and shape of the mark in the captured image can thus be generated, whereby the success rate of the detection of the mark from the captured image can be further increased.

In the aspect of the invention, the projection section may include a projection system including a lens, and the information acquired by the information acquirer may contain information on relative positions of the projection surface, an optical axis of the projection system, and the imager.

According to the configuration described above, the calibration image can be generated in correspondence with the relative positions of the projection surface, the optical axis of the projection system, and the imager. A calibration image that precisely reflects the position and shape of the mark in the captured image can thus be generated, whereby the success rate of the detection of the mark from the captured image can be further increased.

In the aspect of the invention, the projection section may include a light source and a modulator that forms an image formed of pixels disposed in a plane of the modulator and modulates light emitted from the light source, and the image generator may determine a position of the mark in the captured image based on the information acquired by the information acquirer and converts coordinates of the mark in the captured image into coordinates on the modulator to generate the calibration image.

According to the configuration described above, a calibration image can be so generated that the shape of the mark in the captured image is readily detectable. The success rate of the detection of the mark from the captured image can therefore be further increased.

Another aspect of the invention is directed to a method for controlling a projector including a projection section that projects an image on a projection surface and an imager that captures an image of a range containing at least part of the projection surface, the method including acquiring information on a state in which the projector is installed with respect to the projection surface, generating, based on the acquired information, a calibration image corresponding to the state in which the projector is installed, projecting the generated calibration image via the projection section, causing the imager to capture the calibration image projected on the projection surface, and detecting a mark from a captured image from the imager to perform calibration.

According to the aspect of the invention, the method, which uses the calibration image corresponding to the state in which the projector is installed, is advantageously likely to detect the mark in the calibration image when performing the calibration. The success rate of the calibration can thus be increased, whereby the calibration can be efficiently performed.

The invention can be implemented in a variety of forms other than the projector and the method for controlling the projector described above. For example, to carry out the method described above, the invention can be implemented in the form of a program executed by a computer (or processor). The invention can also be embodied, for example, in the form of a recording medium on which the program described above is recorded, a server apparatus that distributes the program, a transport medium that transports the program described above, or a data signal carrying the program described above embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Overview of Projection System

Figure 1:
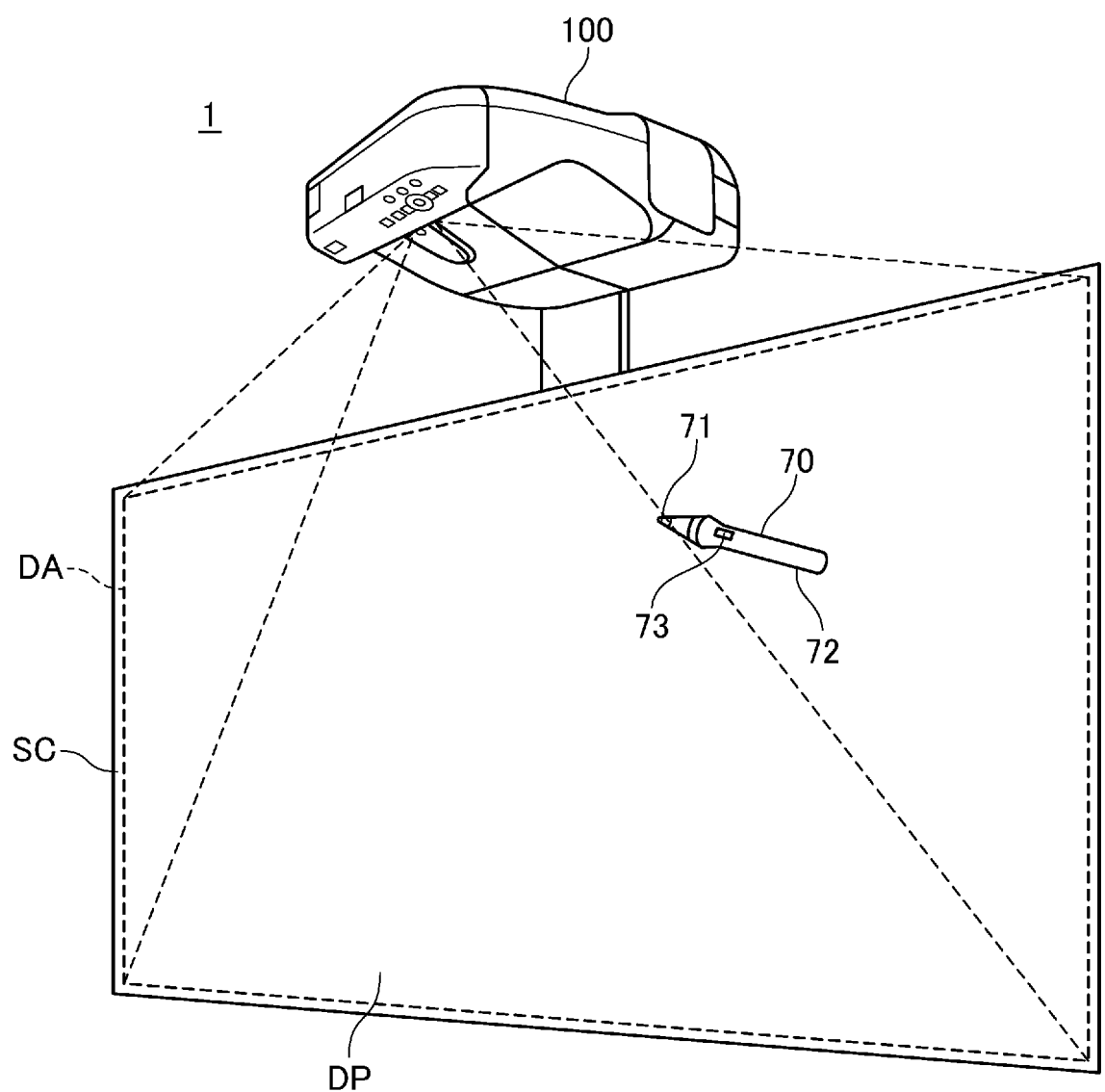
FIG. 1 is a schematic configuration diagram of a projection system.

FIG. 1 is a perspective view of a projection system 1 in an embodiment of the invention. The projection system 1 includes a projector 100 and a pointing element 70.

The projector 100 projects image light on a projection target to form an image on the surface of the projection target. FIG. 1 shows a configuration example in which the projector 100 performs projection on a screen SC (projection surface) formed of a flat surface. The projection target on which the projector 100 projects an image is not limited to a flat surface and may instead be, for example, a curtain or a wall surface. The function and action of projecting an image on the screen SC that are provided and performed by the projector 100 correspond to "display" performed by a display apparatus.

In the configuration example shown in FIG. 1, the projector 100 is installed in a position above the screen SC and projects image light downward to form a projection image DP on the screen SC. On the screen SC, the range over which the projector 100 projects the image light is called an image projection area DA. The image projection area DA is a maximum range over which the projector 100 can project the projection image DP.

The pointing element 70 is a pen-shaped, handheld device used by a user who operates the projector 100. The pointing element 70 includes a tip button 71, which is disposed at the front end of the pointing element 70, a shaft section 72, which the user grips, and a side button 73, which is provided on the shaft section 72. The tip button 71 is a switch that is turned on when pressed against the screen SC. The side button 73 is a switch that the user presses with a finger. When the user points at a position on the screen SC by using the pointing element 70, the projector 100 uses the function of a position detection unit 400 (FIG. 2), which will be described later, to detect the position at which the pointing element 70 points.

2. Configuration of Pointing Element

Figure 2:
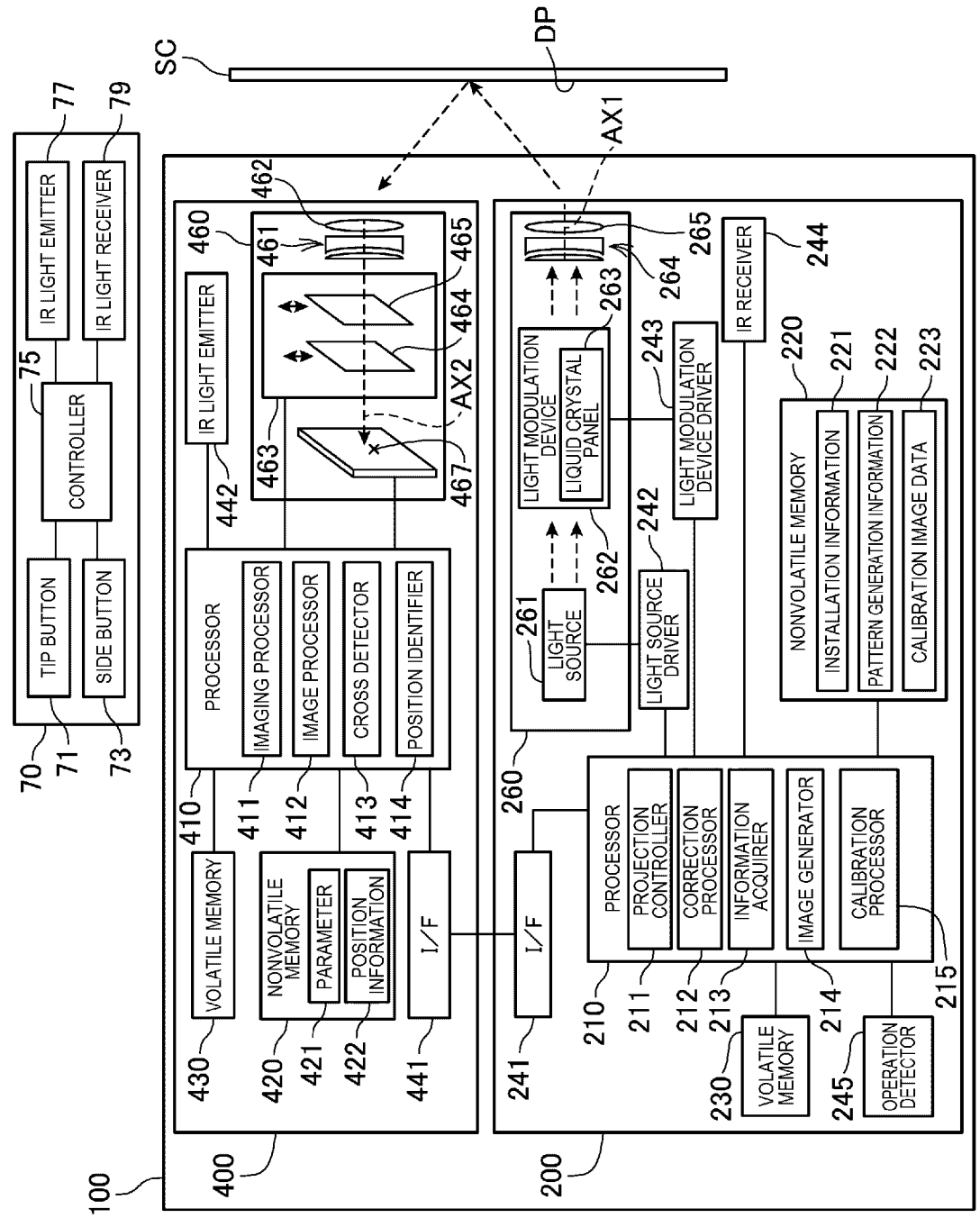
FIG. 2 is a block diagram of a projector and a pointing element that form the projection system.

FIG. 2 is a block diagram of the projector 100 and the pointing element 70 which form the projection system 1.

The pointing element 70 includes the tip button 71, the side button 73, a controller 75, an infrared light emitter 77, and an infrared light receiver 79. The controller 75 is an IC (integrated circuit) that controls each of the portions of the pointing element 70. The infrared light emitter 77 includes a light source that emits light that belongs to the infrared light region, such as an LED (light emitting diode).

The controller 75 operates the infrared light emitter 77 to cause it to periodically transmit an infrared light signal. The infrared light signal transmitted by the infrared light emitter 77 may contain, for example, an identification code that allows identification of the pointing element 70 from other pointing elements.

The infrared light receiver 79 receives a sync infrared light signal transmitted by the position detection unit 400, which will be described later, and outputs the sync infrared light signal to the controller 75. The controller 75 causes the infrared light emitter 77 to transmit the infrared light signal in synchronization with the signal received by the infrared light receiver 79.

The controller 75 is configured to be capable of detecting operation performed on each of the tip button 71 and the side button 73. The controller 75, when detecting operation performed on the tip button 71 or the side button 73, adds operation data representing the detected operation to the infrared light signal to be transmitted by the infrared light emitter 77.

3. Configuration of Projector

The projector 100 includes a projection unit 200, which projects the projection image DP, and the position detection unit 400. In the present embodiment, an enclosure of the projector 100 accommodates the projection unit 200 and the position detection unit 400. The position detection unit 400 may instead be configured as a component separate from the enclosure of the projector 100. In the description, the projection unit 200 and the position detection unit 400 are connected with a wire to each other via interfaces 241 and 441, which will be described later, and may instead be connected to each other over wireless communication.

The projector 100 is connected to a variety of instruments that each function as a video image source and projects an image based on video image data inputted from any of the video image sources. The video image sources are each an instrument that sends data to be displayed to the projector 100 and are, for example, a video image reproducing apparatus, such as a DVD (digital versatile disk) player, and a personal computer. The projection unit 200 includes interfaces, not shown, connectable to the variety of instruments, which each act as a video image source. The projection unit 200 can use video image data stored in a nonvolatile memory 220, which will be described alter, as the video image source.

The projection unit 200 includes a processor 210, the nonvolatile memory 220, a volatile memory 230, and an image projection section 260. The projection unit 200 further includes the interface (I/F) 241, a light source driver 242, a light modulation device driver 243, an infrared light (IR) receiver 244, and an operation detector 245.

The processor 210 is a computation processing device formed of a CPU (central processing unit) or a microcomputer, controls each of the portions of the projection unit 200, and processes a variety of data including image data. The processor 210 may be configured to execute a control program stored in the nonvolatile memory 220 to perform the functions described above. In this case, the processor 210 achieves a variety of functions described later based on cooperation between software and hardware. The processor 210 may be formed of a single processor or a plurality of processors. The processor 210 may instead be formed of hardware in which the variety of functions described later are implemented. For example, the processor 210 may be formed of the combination of a CPU that executes a program and a DSP (digital signal processor) that carries out a predetermined computation process. The entire functions of the processor 210 may be implemented in hardware. The processor 210 may still instead be configured by using a programmable device. The processor 210 may still instead be formed of an SoC (system on chip) integrated with part or entirety of the nonvolatile memory 220 and a volatile memory 230 and other circuits. The functions of the processor 210 will be described later.

The nonvolatile memory 220 is a storage device that stores a program and data in a nonvolatile manner and is formed of a magnetic storage device, a semiconductor storage element, such as a flash ROM, or a nonvolatile storage device of another type. The nonvolatile memory 220 stores installation information 221, pattern generation information 222, and calibration image data 223, which are processed by the processor 210.

The volatile memory 230 temporarily stores data processed by the processor 210, a program executed by the processor 210, and other pieces of information. For example, the volatile memory 230 functions as a frame buffer in which the processor 210 develops each frame of video image data.

The interface 241 is an interface that connects the processor 210 to the position detection unit 400. The interface 241 is connected to the interface 441 provided in the position detection unit 400. The interfaces 241 and 441 can each be a general-purpose interface, such as a USB (universal serial bus).

The infrared light receiver 244 receives the infrared light signal from the direction in which the image projection section 260 projects image light. The infrared light receiver 244 decodes the received infrared light signal and outputs the result of the decoding to the processor 210. The processor 210 detects, for example, the states of the operated tip button 71 and side button 73 of the pointing element 70 based on the infrared light signal received by the infrared light receiver 244.

The operation detector 245 detects operation performed on an operation panel (not shown) of the projector 100 and outputs operation data representing the operation to the processor 210. The operation detector 245 receives and decodes an infrared light signal transmitted from a remote control (not shown) to produce operation data representing operation performed on the remote control and outputs the operation data to the processor 210.

The image projection section 260 (projection section) includes a light source 261, a light modulation device 262, and a projection system 264. The light source 261 is formed of a halogen lamp, a xenon lamp, an ultrahigh-pressure mercury lamp, or any other lamp, an LED (light emitting diode), a laser light source, or any other solid-state light source. The light source 261 emits light by using electric power supplied from the light source driver 242. The light source driver 242 supplies the light source 261 with drive current and pulses. The light source driver 242 may have the function of adjusting the luminance of the light from the light source 261 under the control of the processor 210.

The light modulation device 262 modulates the light emitted from the light source 261 to produce image light and radiates the image light to the projection system 264. The light modulation device 262 includes a light modulation element that forms an image formed of pixels arranged in a plane of the light modulation element. The light modulation element can, for example, be a transmissive liquid crystal panel, a reflective liquid crystal panel, or a digital mirror device (DMD). In the present embodiment, a case where a transmissive liquid crystal panel 263 is employed is presented. The liquid crystal panel 263 (modulator) is driven by the light modulation device driver 243 to form an image, and the light emitted from the light source 261 is modulated when passing through the liquid crystal panel 263.

An image signal for displaying an image processed by the processor 210 is inputted to the light modulation device driver 243. The light modulation device driver 243 drives the light modulation device 262 based on the inputted image signal to cause the light modulation device 262 to draw an image on a frame (screen) basis.

The projection system 264 is an optical system including a projection lens 265 and focuses the light modulated by the light modulation device 262 onto the screen SC. The projection system 264 may be formed of a single projection lens 265, may include a lens group including a plurality of projection lenses 265, or may include a variety of optical elements, such as a prism. The optical axis of the projection system 264 is drawn in the form of an optical axis AX1.

The projection system 264 may include a zoom lens, a focus lens, and other lenses and may further include a lens driver (not shown) that moves a lens group including the lenses described above under the control of the processor 210.

The processor 210 includes a projection controller 211, a correction processor 212, an information acquirer 213, an image generator 214, and a calibration processor 215 as functional portions. The functional portions may be achieved by the processor 210 when it reads and executes a program from the nonvolatile memory 220 or may be achieved by hardware.

The projection controller 211 controls the light source driver 242, the light modulation device driver 243, and the portions of the image projection section 260 to cause them to project video images based on any of the video image sources described above on the screen SC via the image projection section 260. When the projector 100 performs calibration, the projection controller 211 projects a calibration image on the screen SC based on the calibration image data 223 stored in the nonvolatile memory 220.

The correction processor 212 performs geometric correction on the projection image DP projected by the image projection section 260. To correct trapezoidal distortion or a barrel distortion of the projection image DP, the correction processor 212 carries out the process of deforming the image formed on the liquid crystal panel 263 in such a way that the distortion is corrected.

The information acquirer 213 acquires information on the state in which the projector 100 is installed and stores the information as the installation information 221 in the nonvolatile memory 220. For example, the information acquirer 213 acquires the information from the position detection unit 400 via the interface 241. In this case, the installation information 221 contains, for example, position information 422 acquired from the position detection unit 400. The information acquirer 213 may instead acquire the information based on operation performed on the remote control (not shown) or the operation panel (not shown). In a case where the projection unit 200 includes a communication device that is not shown, the information acquirer 213 may perform data communication with an external apparatus via the communication device to acquire the information. The information acquired by the information acquirer 213 will be described later in detail.

The image generator 214 generates the calibration image data 223 for projection of the calibration image based on the installation information 221 acquired by the information acquirer 213. The image generator 214 uses the pattern generation information 222 to generate the calibration image data 223 containing a plurality of marks arranged on a background having a predetermined color. The pattern generation information 222 contains information on the shape of the marks contained in the calibration image data 223 and the rule in accordance with which the marks are arranged.

The calibration processor 215 uses the calibration image data 223 generated by the image generator 214 to perform the calibration.

The position detection unit 400 includes a processor 410, a nonvolatile memory 420, a volatile memory 430, and an imager 460. The position detection unit 400 further includes the interface (I/F) 441 and an infrared light (IR) emitter 442.

The processor 410 is a computation processing device formed of a CPU or a microcomputer, controls each of the portions of the position detection unit 400, and processes a variety of data including image data. The processor 410 may be configured to execute a control program stored in the nonvolatile memory 420 to perform the functions described above. In this case, the processor 410 achieves a variety of functions described later based on cooperation between software and hardware. The processor 410 may be formed of a single processor or a plurality of processors. The processor 410 may instead be formed of hardware in which the variety of functions described later are implemented. For example, the processor 410 may be formed of the combination of a CPU that executes a program and a DSP that carries out a predetermined computation process. The processor 410 may still instead be configured by using a programmable device. The processor 410 may still instead be formed of an SoC integrated with part or entirety of the nonvolatile memory 420 and a volatile memory 430 and other circuits. The functions of the processor 410 will be described later.

The nonvolatile memory 420 is a storage device that stores a program and data in a nonvolatile manner and is formed of a magnetic storage device, a semiconductor storage element, such as a flash ROM, or a nonvolatile storage device of another type. The nonvolatile memory 420 stores parameters 421 and the position information 422 processed by the processor 410.

The volatile memory 430 temporarily stores data processed by the processor 410, a program executed by the processor 410, and other pieces of information. For example, the volatile memory 430 functions as a buffer that temporarily stores a captured image captured by the imager 460 as captured image data.

The interface 441 is connected to the interface 241 and connects the processor 410 to the projection unit 200.

The imager 460 is a digital camera that captures an image of a predetermined image capture range (viewing angle) and outputs captured image data. The image capture range of the imager 460 contains at least part of the screen SC and desirably contains the image projection area DA. In the case where the position detection unit 400 is formed as a component separate from the projection unit 200, the position detection unit 400 is so installed that the image capture range of the imager 460 contains the image projection area DA.

The imager 460 includes an imaging system 461, a filter switcher 463, and an imaging device 466. The imaging system 461 is an optical system including an imaging lens 462, collects the light within the viewing angle, and guides the collected light toward the imaging device 466. The projection system 461 may be formed of a single imaging lens 462, may include a lens group including a plurality of imaging lenses 462, or may include a variety of optical elements, such as a prism. The imaging lens 462 is preferably formed of a wide-angle lens or a fisheye lens so that an image of a wide range including the entire image projection area DA can be captured. The optical axis of the imaging system 461 is drawn in the form of an optical axis AX2.

The imaging system 461 may include a zoom lens, a focus lens, and other lenses and may further include a lens driver (not shown) that moves a lens group including the lenses described above under the control of the processor 410.

The imaging device 466 is formed of a CCD (charge coupled device) image sensor or a CMOS (complementary MOS) image sensor. The imaging device 466 receives the light collected by the imaging system 461 and outputs a light reception signal. The imaging device 466 may include a circuit that converts the light reception signal into image data to generate the captured image data.

The filter switcher 463 includes a visible light transmitting filter 464 and an infrared light transmitting filter 465. The visible light transmitting filter 464 is a filter that transmits light that belongs to the visible light region and is configured not to transmit at least part of the light that does not belong to the visible light region. The infrared light transmitting filter 465 is a filter that transmits light that belongs to the infrared light region and is configured not to transmit at least part of the light that does not belong to the infrared light region.

The filter switcher 463 is disposed in the optical path between the imaging system 461 and the imaging device 466. The filter switcher 463 can insert and retract the visible light transmitting filter 464 and the infrared light transmitting filter 465 into and from the optical path under the control of the processor 410. For example, in a case where the processor 410 detects the position at which the pointing element 70 points based on the captured image data, the infrared light transmitting filter 465 is used to capture an image of the infrared light emitted from the pointing element 70. In a case where the processor 410 processes captured image data containing the projection image DP projected by the projection unit 200, the visible light transmitting filter 464 is used to capture an image of the visible light image projected by the image projection section 260.

The imager 460 performs an action of receiving and capturing the visible light having passed through the visible light transmitting filter 464 in the filter switcher 463 and an action of receiving and capturing an image of the infrared light having passed through the infrared light transmitting filter 465 in the filter switcher 463.

The processor 410 includes an imaging processor 411, an image processor 412, a cross detector 413, and a position identifier 414 as functional portions. The functional portions may be achieved by the processor 410 when it reads and executes a program from the nonvolatile memory 420 or may be achieved by hardware.

The imaging processor 411 controls the imager 460 to cause it to capture an image of a range containing the image projection area DA to acquire captured image data. The imaging processor 411 may switch the visible light transmitting filter 464 to the infrared light transmitting filter 465 in the filter switcher 463 and vice versa, adjust the timing at which the imaging device 466 performs the image capture and the shutter speed and exposure in accordance with which the imaging device 466 performs the image capture, and other processes.

The image processor 412 performs image processing, such as brightness adjustment, contrast adjustment, and color subtraction, on the captured image data acquired under the control of the imaging processor 411.

The cross detector 413 detects the edge of the calibration image and the marks therein from the captured image data processed by the image processor 412 when the projector 100 performs the calibration.

The position identifier 414 detects an image of the light emitted from the pointing element 70 from the captured image data processed by the correction processor 212 to identify the position at which the pointing element 70 points.

The parameters 421 stored in the nonvolatile memory 420 are parameters used in the image processing performed by the image processor 412, the mark detection performed by the cross detector 413, the position detection performed by the position identifier 414, and other processes.

The position information 422 is information on the specifications of the position detection unit 400 and the position where the position detection unit 400 is installed. For example, the position information 422 contains information on the imaging system 461 of the imager 460. Specifically, the position information 422 contains information representing the amount of discrepancy between the intersection of the optical axis AX2 of the imaging lens 462 and the imaging surface of the imaging device 466 (what is called lens center) and an imaging surface reference position 467 of the imaging device 466. The imaging surface reference position 467 is, for example, the center of the imaging surface of the imaging device 466, and the amount of discrepancy between the lens center and the imaging surface reference position 467 varies among projectors. Therefore, the position information 422 may contain information on each product of the projector 100, and the position information 422 may, for example, be written onto the nonvolatile memory 420 when the projector 100 is shipped.

The position information 422 further contains, as the information on the specifications of the imager 460, information on the optical characteristics of the imaging system 461, such as the refractive index of the imaging lens 462, information on the specifications of the captured image data, such as the number of pixels of a captured image, and other pieces of information.

The position information 422 may further contain information representing the relative positional relationship between the imaging system 461 and the projection system 264. The information may contain, for example, the angle between the optical axis AX2 of the imaging system 461 and the optical axis AX1 of the projection system 264. The information may further contain the distance between the point where the optical axis AX1 intersects the screen SC and the point where the optical axis AX2 intersects the screen SC. The position information 422 may further contain the relative positional relationship among the imaging device 466, the imaging system 461 and the projection system 264. The information representing the relative positions contained in the position information 422 may be expressed, for example, in the form of coordinates by using a three-dimensional coordinate system imaginarily set in the space where the projector 100 is installed.

4. Action of Projector 4.1 Overview of Autocalibration

The projector 100 projects the calibration image via the projection unit 200 on the screen SC and captures an image of the calibration image via the position detection unit 400 to perform autocalibration. The autocalibration is the process of generating calibration data for position detection performed by the position identifier 414. In detail, the autocalibration is the process of generating calibration data that makes a position on a captured image captured by the imager 460 correspond to a position on the projection image DP projected by the projection unit 200.

Figure 3:
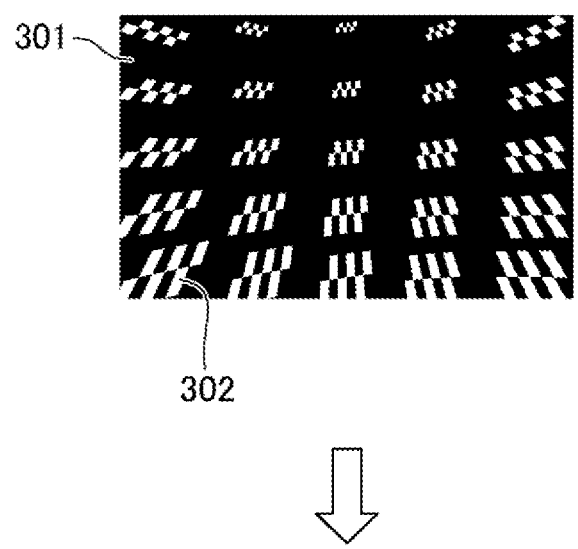
FIG. 3 is a descriptive diagram showing an example of correspondence between a calibration image and a captured image.
Figure 3:
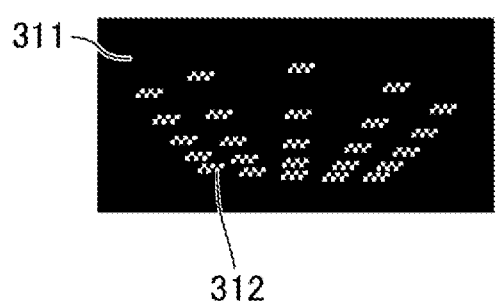

FIG. 3 is a descriptive diagram showing an example of correspondence between the calibration image and a captured image. A calibration image 301 is an example of the calibration image projected by the projection unit 200. A captured image 311 is an example of the captured image that is the result of an action in which the imager 460 captures an image of the screen SC with the calibration image 301 projected by projection unit 200.

The calibration image 301 is an image developed in the frame buffer of the volatile memory 230. The calibration image 301 is an image having position detection marks 302 arranged in a predetermined background. The number of marks 302 arranged in the calibration image 301 is not limited to a specific number. In the case of the calibration image 301, the marks 302 are arranged in a matrix formed of five vertical columns and five horizontal rows. The color of the background and the color of the marks 302 are so determined that the differences in luminance and grayscale between the background and the marks 302 are greater than or equal to predetermined values and therefore advantageous to the action in which the cross detector 413 detects the boundary between the marks 302 and the background. In a case where the image processor 412 performs color subtraction on the captured image data to form a grayscale or binary image before the process carried out by the cross detector 413, the colors are preferably so determined that the background and the marks 302 do not have the same color. For example, the marks 302 have a high-luminance color, such as white, and the background has a low-luminance color, such as black.

The calibration image 301 shown in FIG. 3 is a rectangular image so that it corresponds to a rectangular display area of the liquid crystal panel 263. In the calibration image 301, at least any of the marks 302 is located in an end portion of the calibration image 301. More preferably, any of the marks 302 is located in a corner portion of the calibration image 301. Still more preferably, part of any of the marks 302 overlaps with a corner of the calibration image 301. A corner portion of the calibration image 301 refers to one or more of the four angled portions of the rectangular calibration image 301 and the vicinity of the angled portion. The corners of the calibration image 301 refer to the angled portions of the rectangular calibration image 301. The mark 302 in an end portion of the calibration image 301 is used to detect an end of the projection image DP.

The captured image 311 is an image that is the result of the action of capturing an image over a viewing angle containing the image projection area DA and is distorted resulting from the fact that the imaging lens 462 is a wide-angle lens. Further, in a case where the optical axis AX2 is not perpendicular to the screen SC, the captured image is distorted. In the example shown in FIG. 3, marks 312, which are images of the marks 302, have shapes different from those of the marks 302 due to the distortion. In particular, the marks 302 located in the corner portions of the calibration image 301 are greatly distorted in the captured image 311.

Depending on the shapes of the marks 312 in the captured image 311, the process in which the processor 410 detects the marks 312 fails in some cases. Examples of the failure may include a case where the boundary between the end of the any of the marks 312 and the background is unclear and a case where any of the marks 312 has a shape that is difficult to recognize as a geometric figure. In such a case, another calibration image 301 having a different number or different positions of marks 302 can be used to retry the calibration. The period required for the calibration, however, increases.

The projector 100 according to the present embodiment generates a calibration image corresponding to the state in which the projector 100 is installed and uses the generated calibration image to perform the calibration. Since the calibration image corresponds to the state in which the projector 100 is installed, it is expected to improve the success rate of the detection of the marks 312 from the captured image 311.

The action described above will be described below.

4-2. Details of Calibration

Figure 4:
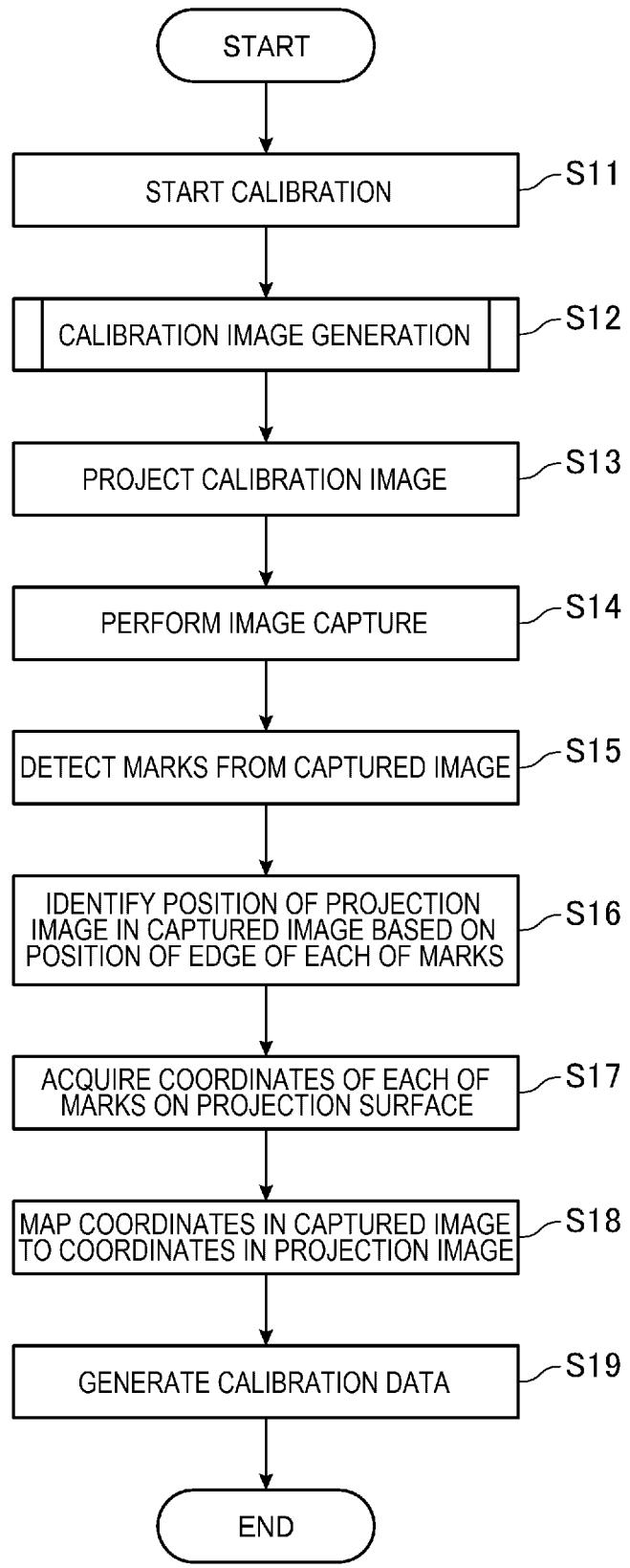
FIG. 4 is a flowchart showing the actions of the projector.

FIG. 4 is a flowchart showing the actions of the projector 100 and shows actions relating to the calibration.

The processor 210 starts the calibration when a calibration start condition is satisfied (step S11). The calibration start condition is satisfied, for example, when the projector 100 is activated for the first time after installed, when operation detected by the operation detector 245 instructs the calibration, and when a calibration execution timing set in advance is reached.

The processor 210 uses the functions of the information acquirer 213 and the image generator 214 to carry out a calibration image generation process (step S12) of generating a calibration image. The process in step S12 will be described later. In step S12, calibration image data is generated and stored as the calibration image date 223 in the nonvolatile memory 220.

The processor 210 uses the functions of the calibration processor 215 and the projection controller 211 to project an image based on the calibration image data 223 generated in step S12 via the image projection section 260 (step S13).

The processor 410 subsequently uses the function of the information processor 411 to control the imager 460 to cause it to capture an image of the image projection area DA where the calibration image has been projected (step S14). In step S14, the processor 410 acquires captured image data from the imaging processor 411 and temporarily stores the captured image data in the volatile memory 430.

The preprocess 410 causes the cross detector 413 to detect an image corresponding to each of the marks in the calibration image from the captured image (step S15). In step S15, the image processor 412 may perform, for example, color subtraction on the captured image data before the process carried out by the cross detector 413.

The processor 210 subsequently causes the calibration processor 215 to identify the edge of each of the images of the marks detected in step S15 by the cross detector 413 to identify the position of the projection image DP in the captured image (step S16). The edge of each of the images of the marks can also be called an outer edge of the mark and refers in detail to the boundary between the background and the dots that form the image of the portion where the mark has been captured.

The calibration processor 215 detects and acquires the coordinates of each of the marks in the calibration image projected via the image projection section 260 (step S17). The calibration processor 215 makes the coordinates in the captured image correspond to the coordinates in the projection image based on the coordinates captured in step S17 and the coordinates of the marks in the captured image detected by the cross detector 413 (step S18). The calibration processor 215 generates calibration data (not shown) representing the result of the correspondence in step S18, stores the calibration data in the nonvolatile memory 220 (step S19), and terminates the calibration.

Using the calibration data generated by the calibration processor 215 allows the coordinates on an image projected by the position detection unit 400 to be determined from arbitrary coordinates on a captured image from the imager 460. Therefore, in a case where the processor 410 identifies the position at which the pointing element 70 points in a captured image, the processor 210 can obtain the coordinates of the pointing position in the image developed in the buffer of the volatile memory 230. An image projected in the position at which the pointing element 70 points can thus be identified, whereby, for example, operation performed on a GUI (graphical user interface) by using the pointing element 70 or any other tool can be detected.

4-3. Generation of Calibration Image

Figure 5:
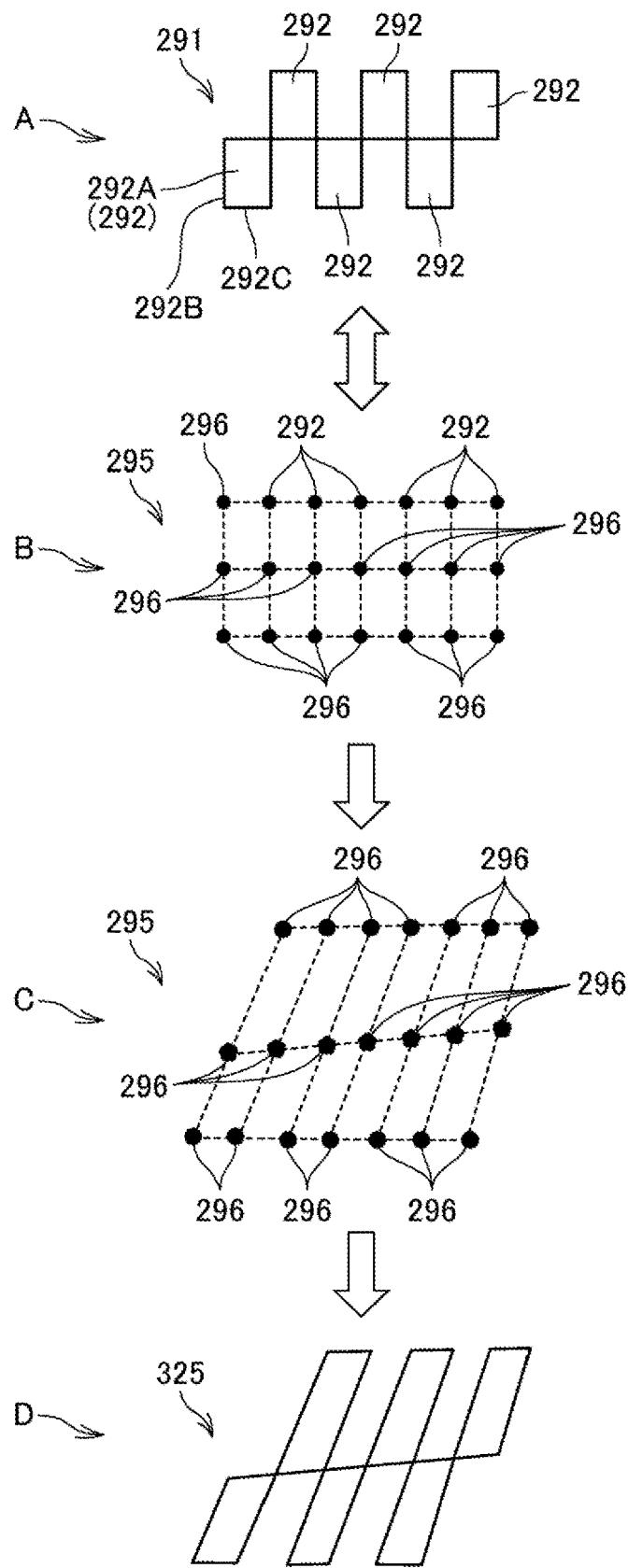
FIG. 5 is a descriptive diagram showing a process relating to a mark in a calibration image generation process.

FIG. 5 is a descriptive diagram showing a process relating to one of the marks in the calibration image generation process.

Reference character A in FIG. 5 represents a mark 291 having a preferable shape in a captured image from the imager 460. The mark 291 is formed of a combination of a plurality of rectangles 292. A rectangle 292A located at a corner of the mark 291 has sides 292B and 292C perpendicular to each other. For example, in a case where the mark 291 is a mark located in the lower left corner portion of the calibration image, the rectangle 292A is located at the lower left corner of the calibration image. That is, the intersection of the sides 292B and 292C represents a corner of the calibration image and the position of a lower left end portion of the projection image DP. The condition in which the rectangle 292A in a captured image has sides perpendicular to each other is therefore advantageous in the detection of the boundary of the projection image DP from the captured image. Further, in a case where the rectangle 292A is a rectangle in the captured image, the success rate of the detection of the rectangle 292A increases.

To this end, the image generator 214 generates a calibration image containing the mark 291 indicated by the reference character A in FIG. 5.

The image generator 214 processes a model FIG. 295, as indicated by the reference character B in FIG. 5, to identify the shapes and positions of the plurality of rectangles 292, which form the mark 291. The model FIG. 295 is a set of a plurality of reference points 296, which correspond to the vertices of the rectangles 292, and can reproduce the mark 291 when the reference points 296 are connected to each other with straight lines.

The image generator 214 converts the coordinates of the reference points 296 of the model FIG. 295 in the captured image into the coordinates in the light modulation device 262 and further converts the converted coordinates into the coordinates on the image developed by the projection controller 211 in the buffer of the volatile memory 230. Reference character C in FIG. 5 represents the converted coordinates.

The image generator 214 connects the converted reference points 296 to each other with straight lines to form a mark 325 to be placed in the calibration image. The mark 325 is so placed as to be superimposed on a rectangular background. A calibration image is thus formed.

Figure 6:
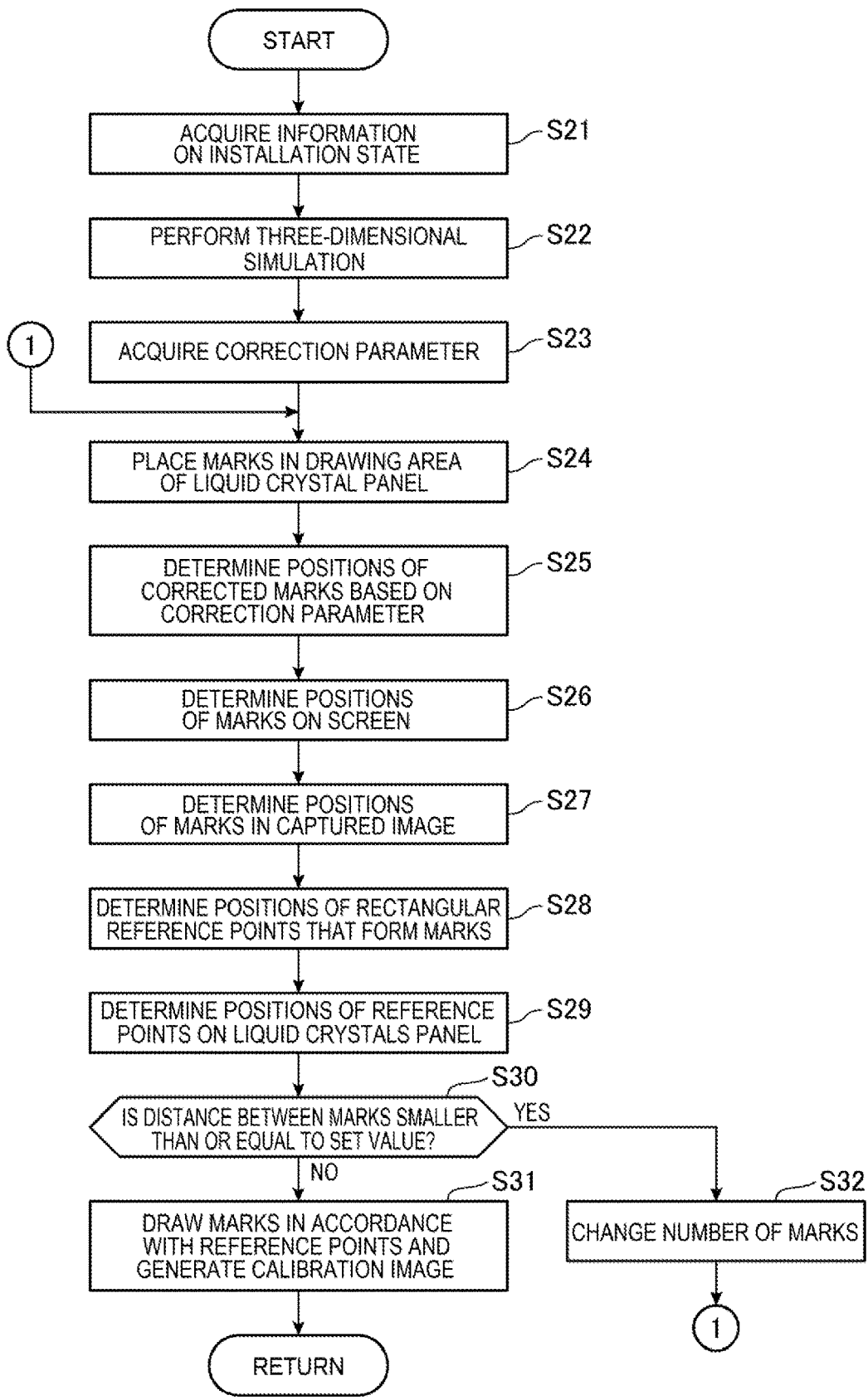
FIG. 6 is a flowchart showing the actions of the projector.

FIG. 6 is a flowchart showing the actions of the projector 100 and shows the calibration image generation process shown in step S12 in FIG. 4.

The processor 210 acquires information on the state in which the projector 100 is installed from the information acquirer 213 (step S21).

The image generator 214 subsequently performs a three-dimensional simulation based on the information acquired in step S21 (step S22). In step S22, the image generator 214 reproduces in an imaginary simulation space the relative positions of the projection lens 265, the imaging lens 462, and the screen SC in the three-dimensional space.

Figure 7:
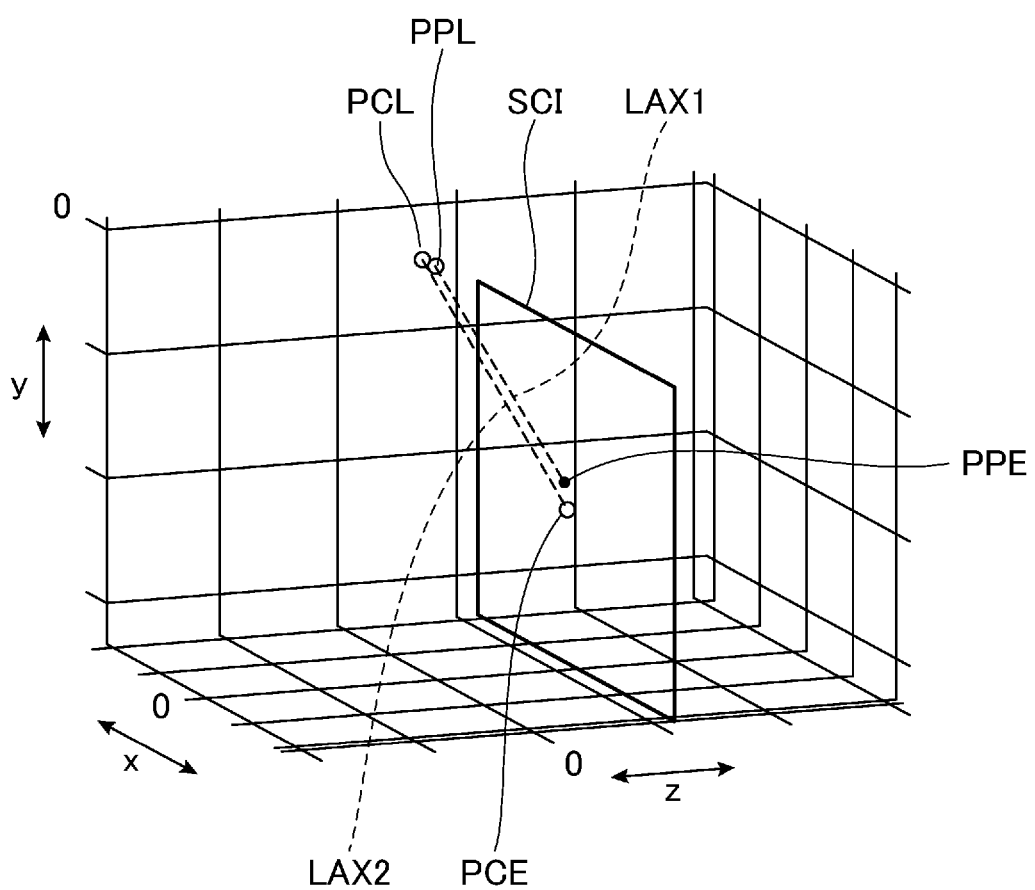
FIG. 7 is a descriptive diagram of the calibration image generation process.

FIG. 7 is a descriptive diagram of the calibration image generation process and diagrammatically shows the three-dimensional simulation in step S22.

FIG. 7 shows a case where a point PPL representing the position of the projection lens 265, a point PCL representing the position of the imaging lens 462, and a plane SCI representing the imaginary position of the screen are placed in a three-dimensional space. An X-Y-Z orthogonal coordinate system is set in the three-dimensional space in FIG. 7, and the positions of the points PPL and PCL and the plane SCI can be identified in the form of (X, Y, Z) coordinates.

The image generator 214 calculates the coordinates of the points PPL and PCL and the plane SCI based on the information acquired by the information acquirer 213. The image generator 214 further calculates the coordinates of an intersection PPE of the optical axis AX1 of the projection lens 265 and the plane SCI and an intersection PCE of the optical axis AX2 of the imaging lens 462 and the plane SCI. The intersection PCE can be called a camera lens center position and is used to determine the correspondence between the shape and coordinate of the projection image DP and those of the captured image.

The relative positions of the points and the plane in the three-dimensional space determine the relative relationship among the calibration image developed by the projection controller 211 in the volatile memory 230, the image drawn on the liquid crystal panel 263, the projection image DP on the screen SC, and the image captured by the imager 460. Performing the simulation in step S22 therefore allows determination of the correspondence relationship among the coordinates of the calibration image, the image drawn on the liquid crystal panel 263, the projection image DP, and the captured image.

To perform the simulation shown in FIG. 7, the information acquired by the information acquirer 213 in step S21 is information on the state in which the projector 100 is installed. The information can be broadly divided into information on the configuration or specifications of the projection unit 200, information on the configuration or specifications of the position detection unit 400, and information on the positions thereof relative to each other.

The information on the configuration or specifications of the projection unit 200 is the zoom magnification of the projection system 264, the aspect ratio of the liquid crystal panel 263, and other factors.

The information on the configuration or specifications of the position detection unit 400 is a variety of pieces of information contained in the position information 422. For example, the information contains information on the optical characteristics of the imaging system 461, such as the refractive index of the imaging lens 462, and information on the specifications of the captured image data, such as the number of pixels and aspect ratio of a captured image. The information further contains, for example, information on the relative positions of the optical axis AX2 and the imaging device 466. Specifically, the information may contain information representing the amount of discrepancy between the lens center, which is the intersection of the optical axis AX2 of the imaging lens 462 and the imaging surface of the imaging device 466, and the imaging surface reference position 467 of the imaging device 466.

The information on the positions of the projection unit 200 and the position detection unit 400 relative to each other may contain, for example, information representing the relative positional relationship between the imaging system 461 and the projection system 264. Specifically, the information may contain the angle between the optical axes AX2 and AX1. The information may contain the distance between the point where the optical axis AX1 intersects the screen SC and the camera lens center position. The information may contain the relative positional relationship among the imaging device 466, the imaging system 461, and the projection system 264. The information may contain information on the relative positions of the screen SC and the imager 460. The information may contain information on the relative positions of the screen SC and the optical axis AX2 of the imaging lens 462. The information may contain information on the relative positions of the screen SC, the projection system 264 and the image 460.

Referring back to FIG. 6, the information acquirer 213 acquires a parameter for the geometric correction performed by the correction processor 212 (step S23).

The image generator 214 places the calibration image marks in the drawing area of the liquid crystal panel 263 (step S24). The image generator 214 subsequently determines the positions of the marks placed in step S24 after the geometric correction based on the correction parameter acquired in step S23 (step S25).

Figure 8:
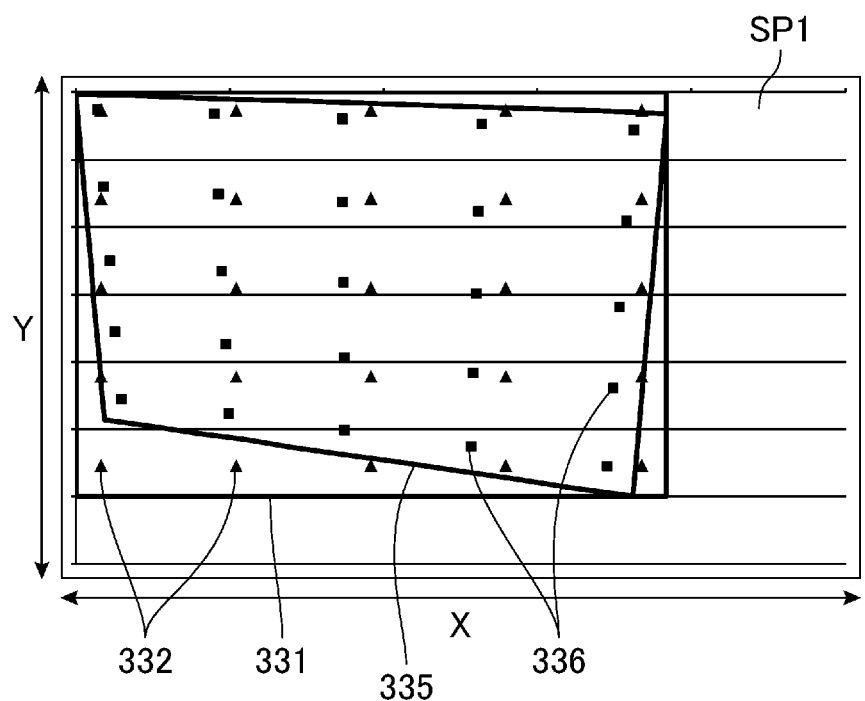
FIG. 8 is a descriptive diagram of the calibration image generation process.

FIG. 8 is a descriptive diagram of the calibration image generation process and diagrammatically shows the processes in steps S24 and S25. FIG. 8 shows a panel space SP1 corresponding to the drawing area of the liquid crystal panel 263. The panel space SP1 is an imaginary space showing the drawing area of the liquid crystal panel 263, and a position in the panel space SP1 can be considered as a position on the image drawn on the liquid crystal panel 263.

The image generator 214 places an image 331 corresponding to the calibration image in the panel space SP1. The image 331 has a rectangular shape and includes a plurality of marks. The size and position of the image 331 in the panel space SP1 are determined based on the display resolution of the liquid crystal panel 263. The image 331 includes a plurality of marks, and reference characters 332 represent the positions of the marks. In the following example, 25 marks are arranged in a matrix formed of five vertical columns and five horizontal rows. The positions 332 are typical positions of the 25 marks when they are arranged, and the 25 marks are arranged in the image 331 at uniform intervals. The image generator 214 places the image 331 in the panel space SP1 and calculates the coordinates of the positions 332 in step S24.

The image 331 is an image before the geometric correction and is deformed in the geometric correction. Reference character 335 represents an image corresponding to the image 331 after the geometric correction. The geometric correction shifts the positions of the marks contained in the image 335 to positions 336 from the positions 332. The image generator 214 calculates the coordinates of the shifted positions 336 in step S25.

The image generator 214 determines the positions of the marks on the screen SC that correspond to the positions of the marks after the geometric correction (step S26).

Figure 9:
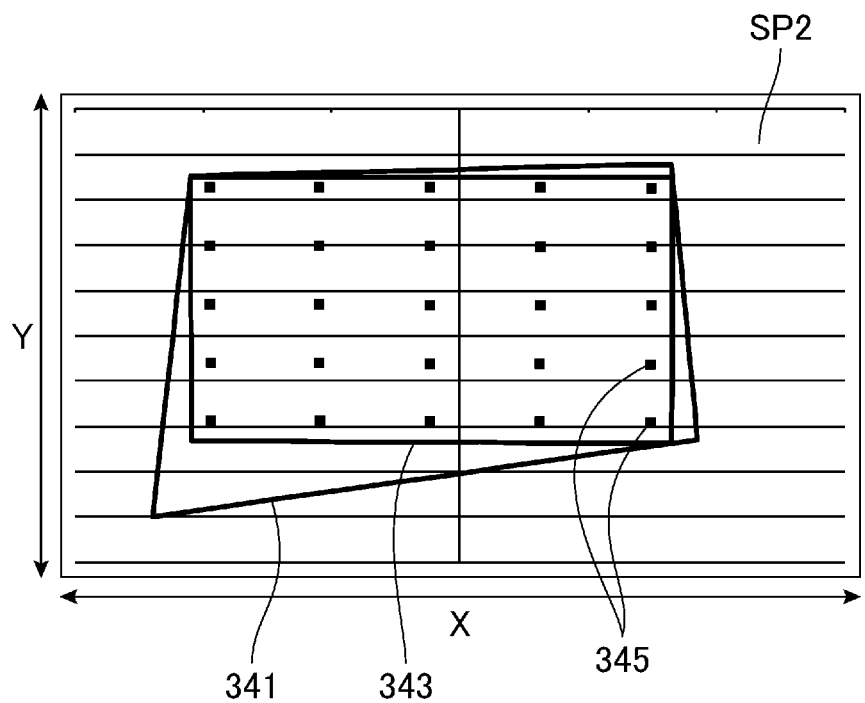
FIG. 9 is a descriptive diagram of the calibration image generation process.

FIG. 9 is a descriptive diagram of the calibration image generation process and diagrammatically shows the process in step S26.

FIG. 9 shows a screen space SP2 corresponding to the image projection area DA of the screen SC. The screen space SP2 is an imaginary space representing the image projection area DA, and a position in the screen space SP2 can be considered as a position on the screen SC.

In the screen space SP2, a projection image 341 corresponding to the image 331 having undergone no geometric correction has trapezoidal distortion. In contrast, a projection image 343 corresponding to the image 335 having undergone the geometric correction has a rectangular shape, and positions 345 of the marks contained in the projection image 343 are uniformly arranged in the projection image 343.

The image generator 214 calculates the coordinates of the positions 345 of the marks in the screen space SP2 in step S26.

The image generator 214 determines the positions of the marks in the captured image based on the correspondence between the screen SC and the captured image (step S27).

The image generator 214 further places rectangular reference points that form the marks in such a way that the reference points coincide with the positions of the marks determined in step S37 and determines the positions of the reference points (step S28).

Figure 10:
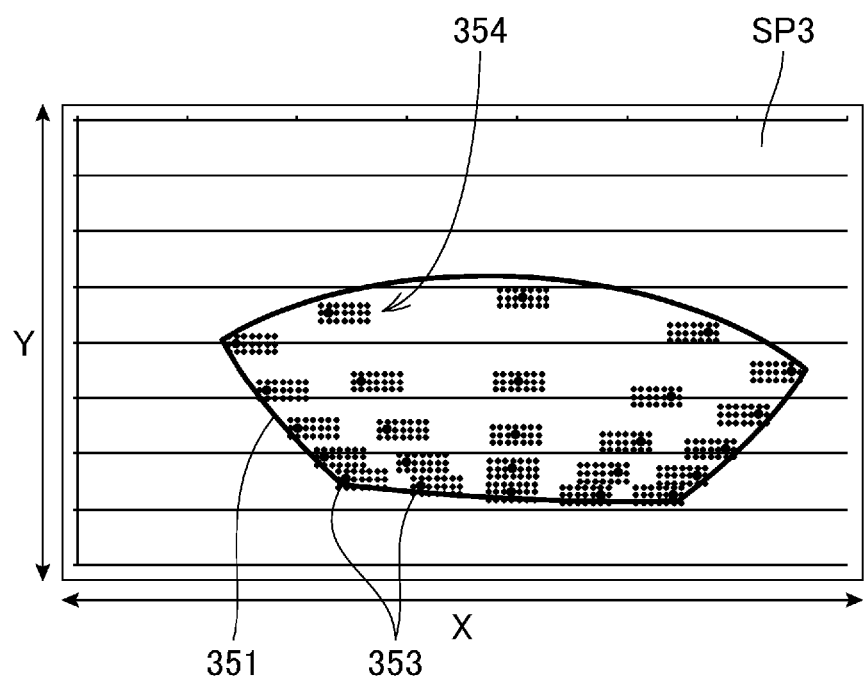
FIG. 10 is a descriptive diagram of the calibration image generation process.

FIG. 10 is a descriptive diagram of the calibration image generation process and diagrammatically shows the processes in steps S27 and S28.

FIG. 10 shows an imaging space SP3 corresponding to the imaging surface of the imaging device 466. The imaging space SP3 is an imaginary space representing the captured image, and a position in the imaging space SP3 can be considered as a position on the captured image.

An image 351 in the imaging space SP3 represents a captured image in a case where the imager 460 captures an image of the projection image 343 in the screen space SP2. The shape of the image 351 is deformed due to the positional relationship between the imager 460 and the screen SC and refraction that occurs in the imaging lens 462.

The image generator 214 determines the coordinates of positions 353 of the marks in the imaging space SP3. Further, the image generator 214 places reference point groups 354 in step S28 in such a way that the reference point groups 354 coincides with the positions 353 corresponding to the 25 marks. The reference point groups 354 are each a set of reference points that are the vertices of the rectangles that form the corresponding mark, as described with reference to FIG. 5. One reference point group 354 corresponds to one mark. The image generator 214 places the reference point groups 354 in such a way that the marks in the captured image have preferable shapes. In each of the reference point groups 354 in FIG. 10, the reference points are arranged in parallel to the X-axis and Y-axis directions. Therefore, in the captured image, the marks each have a rectangular shape having sides parallel to the X-axis and Y-axis directions.

Referring back to FIG. 6, the image generator 214 converts the positions of the reference points in the marks in the captured image to determine the positions of the reference points on the liquid crystal panel 263.

Figure 11:
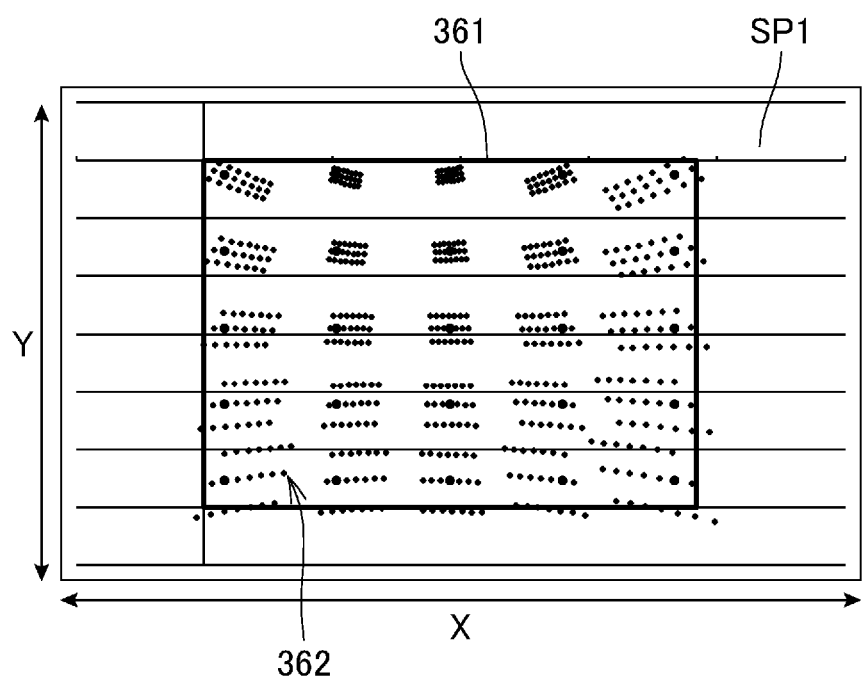
FIG. 11 is a descriptive diagram of the calibration image generation process.

FIG. 11 is a descriptive diagram of the calibration image generation process and diagrammatically shows the process in step S29. FIG. 11 shows the panel space SP1.

The image generator 214 can make the positions in the imaging space SP3 correspond to the positions in the panel space SP1 based on the result of the three-dimensional simulation shown in FIG. 7. The image generator 214 therefore converts the reference point groups 354 placed in the imaging space SP3 in step S28 into those in the panel space SP1. As a result, the reference point groups 362 are placed in the panel space SP1. The image 351 in the imaging space SP3 is a rectangular image 361 in the panel space SP1. The positions of the reference point groups 362 contained in the image 361 and the arrangement of the reference points are shifted based on the correspondence between the panel space SP1 and the imaging space SP3.

The image generator 214 can draw calibration image marks by connecting the reference points placed in step S29 to each other with straight lines.

The thus drawn marks are projected on the screen SC and each have a shape having sides perpendicular to each other in the captured image when an image of the marks are captured by the imager 460. That is, a calibration image having marks readily detected from a captured image can be generated.

Referring back to FIG. 6, the image generator 214 evaluates whether or not the interval between the marks is smaller than or equal to a set value based on the positions of the reference point groups determined in step S29 (step S30).

In a case where the interval between the marks is greater than the set value (No in step S30), the image generator 214 generates a calibration image in accordance with the reference points determined in step S29 (step S31). In step S31, the image generator 214 stores the calibration image data 223 on the generated calibration image in the nonvolatile memory 220 and terminates the present processes.

Figure 12:
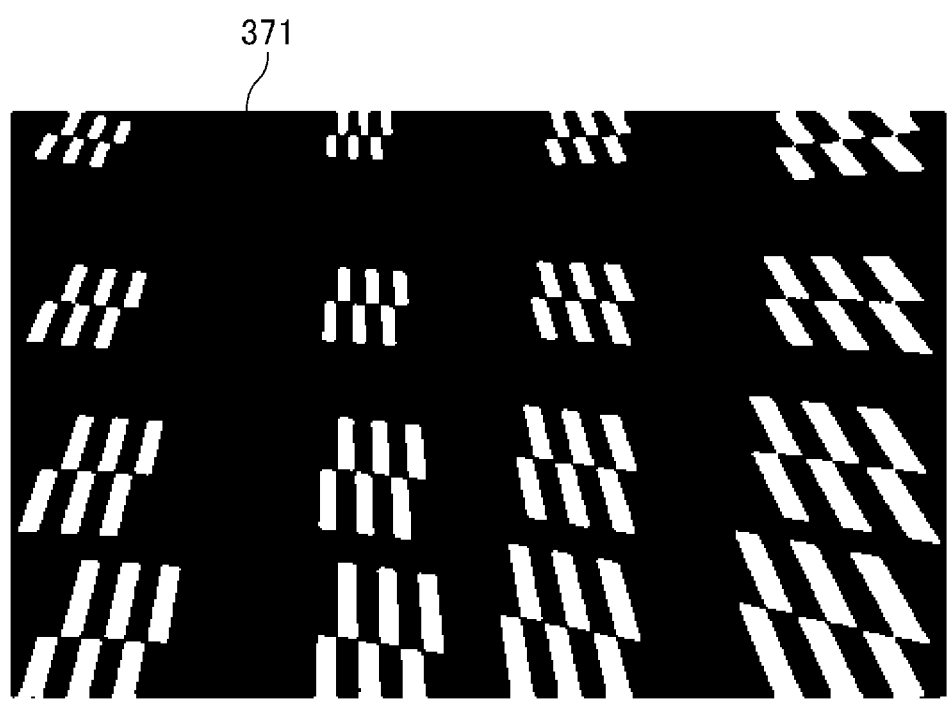
FIG. 12 shows another example of the calibration image.

FIG. 12 shows an example of the calibration image. A calibration image 371 shown in FIG. 12 contains 16 marks in a matrix formed of four vertical columns and four horizontal rows. In a case where the interval between the marks is smaller than or equal to the set value in step S30, the reference points in adjacent marks are close to each other or the marks overlap with each other. The plurality of marks are unlikely to be distinguished from each other in a captured image. The image generator 214 therefore reduces the number of marks in the calibration image in step S32. For example, in a case where the image generator 214 has carried out the process of generating a calibration image containing 25 marks arranged in a matrix formed of five vertical columns and five horizontal rows in steps S24 to S29, the image generator 214 switches to the process of generating a calibration image containing a smaller number of marks, as shown in FIG. 12.

In step S32, the image generator 214 may instead carry out the process of reducing the size of the marks and return to step S24. In this case, a satisfactory interval between the marks can be provided with no decrease in the number of marks.

As described above, the projector 100 according to the present embodiment includes the image projection section 260, which projects an image on the screen SC, and the imager 460, which captures an image of a range containing at least part of the screen SC. The projector 100 further includes the calibration processor 215, which causes the image projection section 260 to project a calibration image in which position identifying marks are arranged and detects the marks from a captured image from the imager 460 to perform the calibration. The projector further includes the information acquirer 213, which acquires information on the state in which the projector 100 is installed with respect to the screen SC. The projector 100 further includes the image generator 214, which generates, based on the information acquired by the information acquirer 213, a calibration image corresponding to the state in which the projector 100 is installed. The calibration processor 215 causes the image projection section 260 to project the calibration image generated by the image generator 214 to perform the calibration.

The projector 100, to which the invention is applied, uses a calibration image corresponding to the state in which the projector 100 is installed and is therefore advantageously likely to detect the marks in the calibration image when performing the calibration. The success rate of the calibration can thus be increased, whereby the calibration can be efficiently performed.

In a captured image that is a result of the action of capturing an image of the calibration image projected on the screen SC, the image generator 214 generates the calibration image in such a way that the marks each have sides perpendicular to each other. The marks in the calibration image are therefore likely to be detected from the captured image, whereby the success rate of the detection of the marks can be further improved.

The image generator 214 generates the calibration image in such a way that the mark located in a corner portion of the projection image projected by the image projection section 260 has a shape having side perpendicular to each other. The mark located at the corner portion of the projection image can therefore be readily detected from the captured image, whereby it can be expected that the accuracy of the calibration is improved.

The image generator 214 generates a calibration image containing a set number of marks, and in a case where the interval between the plurality of marks placed in the calibration image is smaller than or equal to a reference value, the image generator 214 generates a calibration image containing the marks the number of which is smaller than the set value. A satisfactory interval between the marks placed in the calibration image can thus be provided, whereby the success rate of the calibration can be further increased.

The information acquired by the information acquirer 213 contains information on the relative positions of the screen SC and the imager 460. The calibration image can thus be generated in correspondence with the relative positions of the screen SC and the imager 460, which greatly affect the positions and shapes of the marks in the captured image. A calibration image that precisely reflects the positions and shapes of the marks in the captured image can thus be generated, whereby the success rate of the detection of the marks from the captured image can be further increased.

The imager 460 includes the imaging system 461, which includes the imaging lens 462, and the imaging device, and the information acquired by the information acquirer 213 contains information on the relative positions of the screen SC and the optical axis AX2 of the imaging system 461. A calibration image that precisely reflects the positions and shapes of the marks in the captured image can thus be generated, whereby the success rate of the detection of the marks from the captured image can be further increased.

The information acquired by the information acquirer 213 contains information on the relative positions of the optical axis AX2 of the imaging system 461 and the imaging device. A calibration image that precisely reflects the positions and shapes of the marks in the captured image can thus be generated, whereby the success rate of the detection of the marks from the captured image can be further increased.

The information acquired by the information acquirer 213 contains information on the relative positions of the screen SC, the image projection section 260, and the imager 460. The calibration image can thus be generated in correspondence with the relative positions of the screen SC, the image projection section 260, and the imaging device 460. A calibration image that precisely reflects the positions and shapes of the marks in the captured image can thus be generated, whereby the success rate of the detection of the marks from the captured image can be further increased.

The image projection section 260 includes the projection system 264 including the projection lens 265, and the information acquired by the information acquirer 213 contains information on the relative positions of the screen SC, the optical axis AX1 of the projection system 264, and the imager 460. A calibration image that precisely reflects the positions and shapes of the marks in the captured image can thus be generated, whereby the success rate of the detection of the marks from the captured image can be further increased.

The image projection section 260 includes the light source 261 and the liquid crystal panel 263, which forms an image formed of the pixels disposed in a plane of the liquid crystal panel 263 and modulates the light emitted from the light source 261. The image generator 214 determines the arrangement of the marks in the captured image based on the information acquired by the information acquirer 213 and converts the coordinates of the marks in the captured image into the coordinates on the liquid crystal panel 263 to generate a calibration image. The success rate of the detection of the marks from the captured image can therefore be further increased.

5. Other Embodiments

The embodiment described above is a specific example to which the invention is applied, and the invention is not limited to the embodiment.

For example, in the embodiment described above, the information acquirer 213 acquires information from the position detection unit 400 via the interfaces 241 and 441 or acquires information based on operation detected by the operation detector 245. The invention is not limited to the configuration described above. For example, the projector 100 may include a communicator that performs communication over a network, and the communicator may communicate with an external computer or a server apparatus to acquire the information. Further, in a case where the information acquired by the information acquirer 213 is limited information, the image generator 214 may use information stored as a default value in the nonvolatile memory 220 to generate the calibration image.

The above embodiment has been described with reference to the case where the image generator 214 converts a position in any of the three-dimensional simulation space, the panel space SP1, the screen space SP2, and the imaging space SP3 into a position in any of the other spaces. The specific process carried out by the image generator 214 may, for example, be projection transformation of coordinates in any of the spaces into those in any of the other spaces or any other process.

A projector according to an aspect of the invention is not limited to the projector 100 installed in a position above the screen SC. For example, the projector 100 may perform projection on the screen SC from a position in front thereof or from a position below the screen SC. The projector 100 may be a rear-projection-type projector. The projector 100 may be a short-focal-length projector.

The functional portions shown in FIG. 2 each represent a functional configuration and are not each necessarily implemented in a specific form. That it, hardware corresponding to each of the functional portions is not necessarily implemented, and a single processor that executes a program can, of course, achieve the functions of the plurality of functional portions. Further, part of the functions achieved by software in the embodiment described above may be achieved by hardware, or part of the functions achieved by hardware may be achieved by software. In addition, the specific detailed configuration of each of the other portions that form the projection system 1 can be arbitrarily changed to the extent that the change does not depart from the substance of the invention.

The entire disclosure of Japanese Patent Application No. 2018-063453, filed Mar. 29, 2018 is expressly incorporated by reference herein.

What is claimed is:

1. A projector comprising:
a projection section that projects an image on a projection surface;
an imager that captures an image of a range containing at least part of the projection surface;
a calibration processor that causes the projection section to project a calibration image in which a position identifying mark is placed and detects the mark from a captured image from the imager to perform calibration;
an information acquirer that acquires information on a state in which the projector is installed with respect to the projection surface; and
an image generator that generates, based on the information acquired by the information acquirer, a calibration image corresponding to the state in which the projector is installed,
wherein the calibration processor causes the projection section to project the calibration image generated by the image generator to perform the calibration,
in the captured image that is a result of an action of capturing an image of the calibration image projected on the projection surface, the image generator generates the calibration image in such a way that the mark has a shape having sides perpendicular to each other, and
the image generator generates the calibration image in such a way that the mark located in a corner portion of the projection image projected by the projection section has a shape having side perpendicular to each other.

2. The projector according to claim 1, wherein the information acquired by the information acquirer contains information on relative positions of the projection surface and the imager.

3. The projector according to claim 1,
wherein the projection section includes a light source and a modulator that forms an image formed of pixels disposed in a plane of the modulator and modulates light emitted from the light source, and
the image generator determines a position of the mark in the captured image based on the information acquired by the information acquirer and converts coordinates of the mark in the captured image into coordinates on the modulator to generate the calibration image.

4. A projector comprising:
a projection section that projects an image on a projection surface;
an imager that captures an image of a range containing at least part of the projection surface;
a calibration processor that causes the projection section to project a calibration image in which a position identifying mark is placed and detects the mark from a captured image from the imager to perform calibration;
an information acquirer that acquires information on a state in which the projector is installed with respect to the projection surface; and
an image generator that generates, based on the information acquired by the information acquirer, a calibration image corresponding to the state in which the projector is installed, wherein the calibration processor causes the projection section to project the calibration image generated by the image generator to perform the calibration, wherein the image generator generates the calibration image containing the mark formed of a set number of marks, and in a case where an interval between the plurality of marks placed in the calibration image is smaller than or equal to a reference value, the image generator generates the calibration image containing the marks the number of which is smaller than the set value.

5. A projector comprising:
a projection section that projects an image on a projection surface;
an imager that captures an image of a range containing at least part of the projection surface;
a calibration processor that causes the projection section to project a calibration image in which a position identifying mark is placed and detects the mark from a captured image from the imager to perform calibration;
an information acquirer that acquires information on a state in which the projector is installed with respect to the projection surface; and
an image generator that generates, based on the information acquired by the information acquirer, a calibration image corresponding to the state in which the projector is installed,
wherein the calibration processor causes the projection section to project the calibration image generated by the image generator to perform the calibration,
the information acquired by the information acquirer contains information on relative positions of the projection surface and the imager,
the imager includes an imaging system including a lens, and an imaging device, and
the information acquired by the information acquirer contains information on relative positions of the projection surface and an optical axis of the imaging system.

6. The projector according to claim 5, wherein the information acquired by the information acquirer contains information on relative positions of the optical axis of the imaging system and the imaging device.

7. A projector comprising:
a projection section that projects an image on a projection surface;
an imager that captures an image of a range containing at least part of the projection surface;
a calibration processor that causes the projection section to project a calibration image in which a position identifying mark is placed and detects the mark from a captured image from the imager to perform calibration;
an information acquirer that acquires information on a state in which the projector is installed with respect to the projection surface; and
an image generator that generates, based on the information acquired by the information acquirer, a calibration image corresponding to the state in which the projector is installed,
wherein the calibration processor causes the projection section to project the calibration image generated by the image generator to perform the calibration,
the information acquired by the information acquirer contains information on relative positions of the projection surface, the projection section, and the imager.

8. The projector according to claim 1,
wherein the projection section includes a projection system including a lens, and
the information acquired by the information acquirer contains information on relative positions of the projection surface, an optical axis of the projection system, and the imager.

9. A method for controlling a projector including a projection section that projects an image on a projection surface and an imager that captures an image of a range containing at least part of the projection surface, the method comprising:
acquiring information on a state in which the projector is installed with respect to the projection surface;
generating, based on the acquired information, a calibration image corresponding to the state in which the projector is installed;
projecting the generated calibration image via the projection section;
causing the imager to capture the calibration image projected on the projection surface;
detecting a mark from a captured image from the imager to perform calibration, and
generating the calibration image containing the mark formed of a set number;
wherein in a case where an interval between the plurality of marks placed in the calibration image is smaller than or equal to a reference value, the method further comprising generating the calibration image containing the marks of the number of which is smaller than the set value.

10. The method for controlling a projector according to claim 9, wherein in the captured image that is a result of an action of capturing an image of the calibration image projected on the projection surface, the calibration image is so generated that the mark has a shape having sides perpendicular to each other.

11. The method for controlling a projector according to claim 9, wherein the acquired information contains information on relative positions of the projection surface and the imager.

12. The method for controlling a projector according to claim 9,
wherein the projection section includes a modulator that modulates light emitted from a light source, and the method further comprising:
determining a position of the mark in the captured image based on the acquired information; and
converting coordinates of the mark in the captured image into coordinates on the modulator to generate the calibration image.

13. The method for controlling a projector according to claim 10, wherein the calibration image is so generated that the mark located in a corner portion of the projected projection image has a shape having side perpendicular to each other.

14. The method for controlling a projector according to claim 11,
wherein the imager includes an imaging system including a lens, and an imaging device, and
the acquired information contains information on relative positions of the projection surface and an optical axis of the imaging system.

15. The method for controlling a projector according to claim 14, wherein the acquired information contains information on relative positions of the optical axis of the imaging system and the imaging device.

16. A method for controlling a projector including a projection section that projects an image on a projection surface and an imager that captures an image of a range containing at least part of the projection surface, the method comprising:
- acquiring information on a state in which the projector is installed with respect to the projection surface;
- generating, based on the acquired information, a calibration image corresponding to the state in which the projector is installed;
- projecting the generated calibration image via the projection section;
- causing the imager to capture the calibration image projected on the projection surface; and
- detecting a mark from a captured image from the imager to perform calibration,
- wherein the acquired information contains information on relative positions of the projection surface, the projection section, and the imager.

17. The method for controlling a projector according to claim 16,
- wherein the projection section includes a projection system including a lens, and
- the acquired information contains information on relative positions of the projection surface, an optical axis of the projection system, and the imager.

* * * * *